United States Patent [19]

Porter

[11] 4,090,272
[45] May 23, 1978

[54] WINDSHIELD WIPER

[75] Inventor: Raymond P. Porter, North Dartmouth, Mass.

[73] Assignee: Acushnet Company, New Bedford, Mass.

[21] Appl. No.: 713,840

[22] Filed: Aug. 12, 1976

[51] Int. Cl.² .............................................. B60S 1/38
[52] U.S. Cl. .............................. 15/250.36; 15/250.42
[58] Field of Search ......................... 15/250.36–250.42

[56] References Cited

U.S. PATENT DOCUMENTS

| | | | |
|---|---|---|---|
| 3,093,856 | 6/1963 | Smithers | 15/250.42 |
| 3,097,389 | 7/1963 | Contant et al. | 15/250.36 UX |
| 3,930,279 | 1/1976 | Arman | 15/250.36 |

FOREIGN PATENT DOCUMENTS

| | | | |
|---|---|---|---|
| 1,564,842 | 4/1969 | France | 15/250.36 |

*Primary Examiner*—Peter Feldman
*Attorney, Agent, or Firm*—Eyre, Mann, Lucas & Just

[57] ABSTRACT

An improved windshield wiper is disclosed. The wiper comprises an upper portion and a lower portion connected by a flexible neck portion. The lower portion comprises a body, and a lip for contacting the windshield. The body supports the lip and is connected to the neck portion. Portions of the body in the areas below connection of the upper portion to supporting superstructure are laterally removed from the extremity of the body inwardly a predetermined distance. Material is not removed from the lip or neck portion. The removal of the material in these areas reduces support of the lip by the body in the removed areas to thereby reduce excess pressure concentrations in, and equalize pressure distributions along, the wiper lip in the vicinity of the connection of the upper portion to supporting superstructure when it is pressed into contact with the windshield by the supporting superstructure.

8 Claims, 2 Drawing Figures

WINDSHIELD WIPER

BACKGROUND OF THE INVENTION

1. Field of the Invention

The present invention relates to windshield wipers having improved pressure distribution between the wiper lip and the windshield thereby resulting in improved wear and wipe characteristics.

2. Description of the Prior Art

Many attempts have been made in known windshield wipers to attain a more uniform pressure distribution along the portion of the wiper which bears against the windshield. Some attempts centered on preventing a non-uniform pressure distribution by concentrating on the manner in which the wiper was connected to the supporting superstructure — a major cause of poor pressure distribution. Other attempts centered on compensating for the non-uniform pressure distribution caused by connection of the supporting super-structure to the wiper, or by the curvature of the windshield. In Mainka U.S. Pat. No. 3,473,186, a windshield wiper is disclosed which comprises a head (upper portion) having base portions and a lower portion having flanges, a front or body and a lip. A neck connects the upper and lower portions and is sufficiently flexible so that under wiping action over a windshield, the downstream flange contacts the downstream base portion to thereby exert pressure on the lip to maintain it in contact with the windshield. The flanges are used to control blade layover and corresponding blade pressure against the windshield. To avoid excessive pressure between the lip and the windshield below the areas of connection of the wiper to the supporting superstructure, it was disclosed to provide flanges whose width varies along the length of the blade in a plane which is parallel to the windshield surface, the width being reduced in zones below the said areas of connection. Such variation in flange width reduces the resistance of the front or body to deformation therebelow in response to engagement of the lip with the windshield, thereby enabling the lip to undergo more pronounced flexing below the said areas. Excessive pressure points were thereby reduced below the said areas of connection due to the increased flexing of the lip and increased layover of the lip and front and the corresponding reduction in force between the reduced width flange and a corresponding base portion. For the improved distribution of pressure in the aforementioned patent, it is essential that there be layover of the body (front) and contact with the base portion during wiping, otherwise there can be no reduction of force against the flange by the base portion with a corresponding reduction in excess pressure of the lip on the windshield.

Two common problems associated with wiper pressure distribution are known in the art as streaking and patching. Both can adversely affect driver vision. Patching is to be distinguished from streaking in that much larger areas are involved. Patching commonly originates from excessive lip and front layover and hydrodynamic action which permits water to pass between the lip and the windshield.

The present invention primarily increases useful wiper life, also reduces patching and streaking, and otherwise improves wiping action by reducing excess pressure concentration between the wiper and a windshield below the areas of connection of the wiper to the supporting superstructure. The foregoing advantages are realized substantially regardless of the degree of blade layover and regardless of contact between the upper and lower portions.

SUMMARY OF THE INVENTION

The present invention is embodied in and carried out by an improved windshield wiper. The wiper comprises upper and lower portions connected by a neck portion. The upper portion is connected in known manner to support superstructure. The lower portion comprises a flangeless base adjacent the neck portion and a lip extending from the base for contacting the windshield surface. In cross section, the base is larger than the lip and provides support therefor. In at least one of the areas in the lower portion below connection of the upper portion to superstructure, a predetermined amount of wiper material is laterally removed from each side of the body, preferably extending from the lip to the neck portion, along the longitudinal direction of the wiper. The depth to which the material is removed, i.e., the removed material thickness, and the distance along the longitudinal direction of the wiper for which material is removed will depend upon the structural and dimensional characteristics of the wiper and the manner of connection of the wiper to the support superstructure, as well as other wiper and windshield characteristics known to those skilled in the art.

These and other aspects of the present invention will be more apparent from the following detailed description of the invention when considered in conjunction with the accompanying drawing.

BRIEF DESCRIPTION OF THE DRAWING

The invention is illustrated by way of example in the figures of the accompanying drawing in which like numerals refer to like parts.

DESCRIPTION OF THE PREFERRED EMBODIMENT

Figure 1:
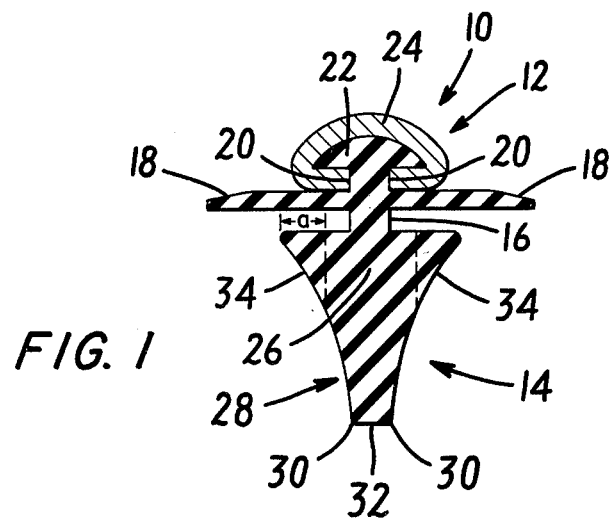
FIG. 1 is a cross section of a windshield wiper according to the invention.
Figure 2:
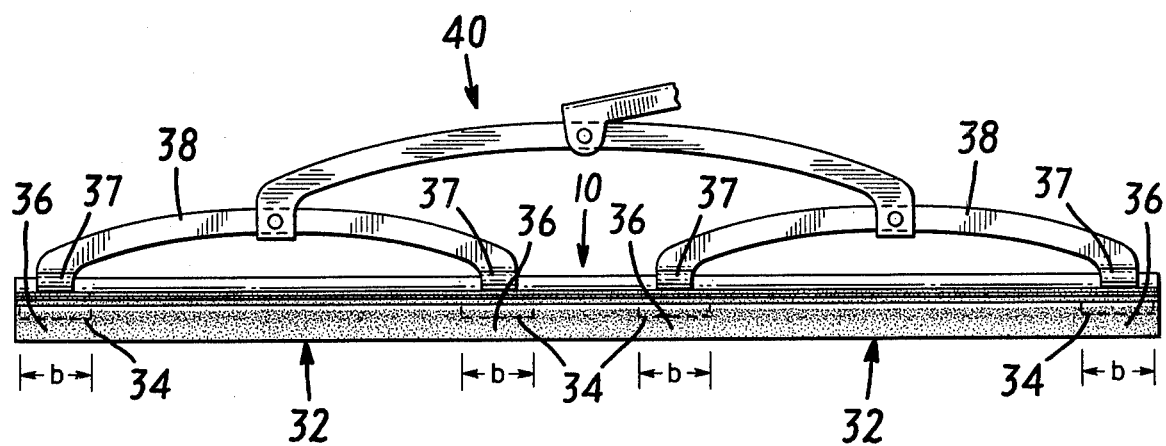
FIG. 2 is a side diagrammatic view of the windshield wiper according to the invention with its supporting superstructure.

Referring to FIG. 1, a cross section of a windshield wiper blade 10 according to the invention is shown. The wiper comprises an upper portion 12, a lower portion 14 and a neck portion 16. Upper portion 12 includes base 18, longitudinally extending lateral grooves 20 and head 22. Flexor 24, made of metal or other suitable material, is inserted with its ends in grooves 20 and its body on head 22. The upper portion 12 is reinforced by flexor 24 to provide longitudinal stiffness along the upper portion. Lower portion 14 comprises flangeless body 26 and lip 28. Body 26 provides structural support for lip 28 as a respective corner 30 of lip edge 32 is pressed against a windshield surface. Neck 16 is sufficiently flexible for the lower portion 14 to pivot or hinge about the neck 16. Referring now to FIGS. 1 and 2, portions 34 of body 26 are removed in the areas 36 below connection of claws 37 of superstructure yokes 38 to the wiper 10. The wiper material is laterally removed from the body 26 to a thickness "$a$" along the longitudinal direction of the wiper for a distance "$b$." The amount of material removed will depend upon many factors and will be discussed more fully hereinafter. The thickness of the remaining body portion for the blade illustrated in FIG. 1 is at least as thick as the lip.

In operation, pressure is transmitted to a respective lip corner 30 by superstructure 40 through claws 37 connected to flexor 24, upper portion 12, and body 26. The pressure transmitted to a respective lip corner 30 has its maximum values in the areas 36 below connection of claws 37 to wiper 10. As discussed hereinbefore, many attempts have been made to equalize the blade pressure along the entire length of the wiper blade. According to the present invention, removal of portions 34 of the body 26 reduces excess pressure points between the respective lip corner 30 and the windshield below the removed areas. Removal of support structure in the body 26 reduces the transmission of pressure in areas 36 such that the pressure distribution in these areas is made substantially uniform rather than being highly non-uniform as for wipers without body material being removed. The pressure in areas 36 is substantially made uniform regardless of whether lip 28 is flexed and overlaying neck 16, and regardless of whether body 26 contacts flanges 18. Removal of material 34 has little or no effect on the lip corner 30 pressure outside of the immediate vicinity of areas 36. The existing pressure distribution outside these areas is substantially unaffected.

While areas 36 of removed material 34 have been shown to include areas toward the ends of the wiper blade, in some cases, blade wear at the blade ends is not sufficiently rapid or objectionable to necessitate the removal of material from the blade body in these regions. Accordingly, material need not be removed from the end areas to practice the present invention. Material may be removed from sides of the body only below selected areas of connection to the superstructure.

In accordance with the present invention, the distribution of specific pressures is improved in the areas below the claws. Blade wear in the areas below the claws is significantly reduced, as is fatiguing of the wiper blade so that the occurrence of excessive blade layover is significantly prolonged. Accordingly, wiper performance with respect to life and patching in the areas below the claws is significantly improved.

As mentioned hereinbefore, the amount of material removed from the areas below the claws will depend upon many factors. As material is increasingly removed from the body in areas below the claws, the maximum specific pressure which occurs directly below the claws for a wiper blade of uniform cross section decreases. Peaks in specific pressure directly below the cut away portion of the wiper blade decrease as sufficient material is removed and tend to merge with the pressures adjacent to form a rather uniform pressure distribution in the areas below the claws and adjacent thereto. However, if an excess of the material is removed in the areas below the claws the specific pressure decreases excessively and correspondingly increases adjacent the areas below the cut-away portions.

When no or insufficient rubber is removed, the wiper blades wear rapidly with use in regions located directly below the claws. Conversely, if too much rubber is removed, the wiper blade wears rapidly along the blade lip in regions located adjacent to the cut-away portion of the wiper blade due to the pressure peaks described hereinbefore. When the proper amount of rubber has been removed, so that the specific pressure is relatively constant immediately below the entire cut-away portion and also adjacent thereto a marked decrease in blade wear is observed as evidenced by the number of wipe cycles required to cause the wiper blade to wear sufficiently that it leaves patches of water in wipe tests. Similarly, this spreading out and evening out the specific pressure makes the wiper blade less susceptible to leaving patches of water not only immediately below but also in the vicinity adjacent the claws. This manifests itself by the increase in the number of wipe cycles required for the wiper blade to fatigue sufficiently for it to leave patches of water in the vicinity of the claws and also in reducing the intensity of the water patches left by fatigued wiper blades.

EXAMPLE I

A wiper blade having material removed from the body portion in accordance with this invention in the vicinity below only the central pairs of claws of the holder with no material being removed from the blade ends withstood four times as many cycles abrading against a dry windshield as did a similar wiper blade having a uniform body cross section before sufficient wear of the blade edge occurred in the areas below the claws, which allowed water to pass thereunder.

EXAMPLE II

A wiper blade having material removed from the body portion in accordance with this invention in the vicinity below both the end pairs of claws of the holder and the central pairs of claws of the holder withstood five times as many cycles abrading against a dry windshield as did a similar wiper blade having uniform body cross section before sufficient wear of the blade edge occurred in the areas below the central claws which allowed water to pass thereunder.

EXAMPLE III

A wiper blade having material removed from the body portion in accordance with this invention in the vicinity below only the central pairs of claws of the holder, with no material being removed from the blade ends withstood 3.3 times as many wipe cycles as did a similar wiper blade having uniform body cross section before the rubber of the wiper blades fatigued sufficiently that they allowed water to pass under the blade lip in the areas below the inner claws of the holder.

The terms removal of material, removing material, removed material and the like as used in the specification and claims of this application are simply a succinct way of defining the particular shape of the windshield wiper blade in the area of claw attachment and is not to be construed as a method limitation. The area of reduced cross-sectional width of the body of the blade can be formed by physically removing the material or by molding the indentations at the time the blade is made or by heat stamping the side of the blade and applicant's nomenclature "removal of material" or the like is generic to all of these various methods of accomplishing the present invention.

While description has been made with respect to a windshield wiper having a neck portion, the invention is equally applicable to windshield wipers not having a neck or hinge since layover of the blade is not essential.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. In a windshield wiper having an upper portion, a lower portion, and supporting superstructure comprising yokes connected to the upper portion by claws, one claw being located towards each end and at least one claw being located intermediate the ends, the improvement comprising:

said lower portion consisting essentially of a flangeless body and a lip extending from the lower side thereof for contacting a windshield, said body supporting said lip, said body having material removed from the sides thereof in the area below at least one intermediate location in which the upper portion is connected to the superstructure, said material being removed from the body for a length longer than the length of the claw, said material being removed parallel to said lip to the upper limit of said body.

2. The windshield wiper of claim 1, wherein the base portion is tapered.

3. The windshield wiper of claim 1, wherein material is removed from below a plurality of locations in which the upper portion is connected to the superstructure.

4. The windshield wiper of claim 3, wherein material removed from said plurality of locations includes the wiper extremities.

5. The windshield wiper of claim 1, further comprising a neck connecting the upper and lower portions, said body on the upper side thereof being affixed to said neck.

6. The windshield wiper comprising an upper portion, a lower portion, a flexible neck portion connecting the upper and lower portions, and supporting superstructure comprising yokes connected to the upper portion by claws, one claw being located towards each end and at least one claw being located intermediate the ends, said lower portion consisiting essentially of a flangeless body affixed to the neck portion on the upper side thereof and having a lip extending from the lower side thereof for contacting a windshield, said body supporting said lip, said body having material removed from the sides thereof in the area below at least one intermediate location in which the upper portion is connected to the superstructure, said material being removed from the body for a length longer than the length of the claw, said material being removed parallel to said lip to the upper limit of said body.

7. The windshield wiper of claim 6, wherein material is removed from below a plurality of locations in which the upper portion is connected to the superstructure.

8. The windshield wiper of claim 7, wherein material removed from said plurality of locations includes the wiper extremities.

* * * * *